United States Patent Office 2,891,947
Patented June 23, 1959

2,891,947

PREPARATION OF STARCH ESTERS

Eugene F. Paschall, Orland Park, and Walter J. Katzbeck, Oak Park, Ill., assignors to Corn Products Company, a corporation of Delaware No Drawing. Application October 24, 1957
Serial No. 692,023

18 Claims. (Cl. 260—233.5)

This invention relates to the preparation of starch half acid esters from starch and anhydrides of dibasic organic acids.

Esters of this type have been known previously but their methods of preparation have certain disadvantages. Heretofore it has been found impossible to react starch with anhydrides of organic acids in an acidic medium without degrading starch to the extent that its useful colloidal properties are destroyed. Methods have been proposed to carry out the esterification reaction under alkaline pH conditions. However, it is not possible by these methods to prepare esters of dibasic acids, for example, having a D.S. (degree of substitution) above 0.04 without gelatinizing the starch to the extent that purification of the ester is very difficult. Nor is it possible to prepare the acid half ester directly since under the alkaline pH conditions the salt of the half ester results directly. Thus it is necessary to prepare the acid ester from the salt of the ester in a separate operation.

It is an object of this invention to provide an improved method for the preparation of starch half acid esters, in undegraded form, from starch and anhydrides of dibasic organic acids. A further object is to prepare such esters in unswollen, granule form. A further object is to prepare such esters in thin boiling form. Still a further object is to prepare such esters at higher D.S. (degree of substitution) levels and in purer form than heretofore possible. Yet another object is to prepare cold water swelling salts of half acid esters of starch. Other objects will appear hereinafter.

These objects may be accomplished by reacting semi-dry starch directly with anhydrides of dibasic organic acids. We have discovered that starch and anhydrides of dibasic organic acids may be reacted under acidic conditions to produce starch half acid esters of dibasic organic acids if the moisture content of the mixture undergoing reaction is maintained within the range of 5 to 20 percent, the temperature within the range of about 50° C. to about 180° C. and the pH within the range of about 1.4 to 5.5.

In carrying out the reaction a homogenous mixture of starch and anhydride, having a moisture content within the range of 5 to 20 percent is heated, as in a vacuum oven, or at atmospheric pressure with or without an air sweep, at about 50° C. to about 180° C. until the desired reaction has taken place. Thereafter the resulting half acid ester is separated from any unreacted anhydride as by washing with water. The pH may be adjusted to neutralize the ester in an aqueous or organic solvent medium, depending on the D.S. of the product, where the salt is desired and the product filtered and dried. The half acid ester may also be neutralized in the dry condition with volatile organic bases, such as ammonia or amines. Whether a thin or thick boiling ester is obtained depends upon the anhydride used and the pH of the reaction mixture.

The principles of the present invention are more advantageously applicable to unswollen, granule starch since recovery of an unswollen, granule starch ester is easier than one which is gelatinized. However, where there is no objection to gelatinized starch esters, the principles are equally applicable and advantageous over prior methods.

The anhydrides which are useful in the present invention may be derived from a variety of dibasic organic acids. By way of example, there may be mentioned such anhydrides as maleic, phthalic, succinic, itaconic, glutaric, dichloromaleic and tetrahydrophthalic which are satisfactory for purposes of the present invention. Mixtures of anhydrides may be used to produce mixed esters of starch. Those anhydrides derived from dibasic acids possessing pK values respectively above about 3 can be reacted with semidry starch (5 to 20 percent moisture) at temperatures ranging from 50° C. up to about 180° C. to produce substantially non-hydrolyzed (thick-boiling) starch half acid esters of dibasic organic acids. By the term "substantially non-hydrolyzed" starch half acid esters, it is meant those products which possess a viscosity about equal to or greater than that of the parent starch.

Time and temperature are interdependent. Surprisingly, we have found that temperatures as high as 180° C. may be employed to produce substantially thick boiling products providing the reaction time is less than about one-half hour. We prefer, however, to employ reaction temperatures in the 110–140° range at reaction times ranging from one hour to about 3 hours.

pK refers to the negative logarithm of the first ionization constant of the parent dibasic acid. Anhydrides derived from organic dibasic acids possessing pK values below about 3 will react with starch in an equally efficient manner but the products formed are acid modified during the reaction to useful thin boiling starch esters, i.e., with paste fluidities ranging up to about 80. Normally, it would be expected that such temperatures, even at the low moisture levels employed, would cause severe degradation of the starch. Thin boiling products may also be produced from any of the aforementioned anhydrides regardless of the pK value of the parent acid by buffering the reaction medium, when necessary, to maintain the pH below about 1.8 but above about 1.4 while thick boiling products can be made similarly but maintaining the pH between about 1.8 and 5.5. It is generally more desirable, however, to prepare thin boiling starch acid esters by esterifying previously acid modified starch under substantially non-hydrolyzing conditions as described above for the preparation of thick boiling starch acid esters.

We have found that dihydrogen phosphates, such as $NaH_2PO_4$ and $KH_2PO_4$, or mixtures of water soluble salts of dihydrogen and monohydrogen phosphates are particularly desirable in buffering the starch-reagent mixture during reaction. Other buffers derived from weak organic acids, such as ammonium acid maleate, or inorganic acids may also be employed. It is only necessary that they are soluble in water and they buffer in the desired pH range. The amount of buffer is dependent to some extent on the amount of anhydride used. Using less than about 0.2 mole of anhydride per mole of glucose unit, we prefer to use about 0.03–0.1 mole of sodium dihydrogen phosphate or a mixture of the monohydrogen and dihydrogen phosphate totaling 0.03– 0.1 mole with respect to phosphate. Using more than 0.2 mole of anhydride, a proportionately greater amount of buffer is desired.

If the anhydride is a liquid, it may be mixed either directly with the starch or diluted with an organic solvent and then mixed with starch. If the anhydride is a solid and/or difficultly soluble in water, a solvent in which the anhydride is soluble, e.g., dioxane, benzene, isopropyl alcohol, dimethylformamide, toluene, hexane, dimethylsulfoxide, methyl ethyl ketone, methyl butyl ketone, methyl propyl ketone may be used to dissolve the anhydride prior to mixing with the semidry starch. The solvent should be inert to starch and to the resulting products of the invention. Solid anhydrides soluble in water and which do not hydrolyze rapidly in cold water, e.g., maleic anhydride, may, of course, be dissolved in water and this solution mixed with the starch. Generally, however, it is more desirable to disperse the anhydride in a solvent inert to both starch and the anhydride in order to dilute the latter so that a more homogeneous dispersion of the reagent in starch can be achieved.

The advantages of the present invention are numerous, the principal one being the provision of carrying out the esterification in an acidic medium. The invention is particularly suited to the direct preparation of half acid esters of starch from anhydrides of organic dibasic acids. The half acid esters are more water insoluble than the corresponding salt form, and, as such, may be purified simply by washing products at D.S. levels up to about 0.12 with water. Products above about 0.12 can be washed with organic solvents but preferably with aqueous organic solvents. On the other hand, the salt forms, which result directly from alkali catalyzed reactions of the prior art, are difficult to wash with water at D.S. levels above about 0.04 because of starch granule swelling or even complete gelatinization. Purified cold water swelling salts of half acid esters of starch may be made by our invention by neutralizing the washed half acid esters (above about 0.05 D.S.) with an alkaline substance, such as sodium hydroxide, sodium carbonate, lime or ammonia, in either an aqueous-organic solvent medium or in a dry system. The invention also provides a means for simultaneous preparation and acid modification of esters and half acid esters of starch.

The following examples which are typical and informative only will further illustrate the invention.

EXAMPLE I

*Preparation of thin boiling starch maleate half ester*

One mole of raw corn starch, 12 percent moisture (180 g.), was dry blended with 0.18 mole of maleic anhydride (pK of maleic acid=2.0) dispersed in 20 ml. of dimethylformamide. The pH was 1.7 when a portion of the mixture was slurried in water. The mixture was heated in a vacuum oven for 3 hours at 100° C. under 95 percent vacuum. The product was cooled, slurried in water, filtered and the filter cake washed with one liter of distilled water. The filter cake was reslurried in 70 percent aqueous methanol and neutralized to pH 9.0 with 0.1 mole of NaOH and filtered. (This quantity of NaOH is approximately equivalent to a 0.1 D.S. product (50 percent reaction efficiency).) The product was in an unswollen, granule form. A 75 g. Scott value of 59 seconds per 100 ml. of paste was observed. The paste was extremely clear and did not setback or develop turbidity on standing.

EXAMPLE II

*Preparation of thick boiling starch succinate half ester*

Thick boiling starch acid succinate may be prepared without buffering the system since the pK of succinic anhydride is above 3.0.

One mole of raw corn starch, 12 percent moisture (180 g.), was dry blended with 0.1 mole of succinic anhydride dispersed in 20 ml. of dimethylformamide (pK of succinic acid=4.19). The pH was 3.5 when a portion of the mixture was slurried in water. The mixture was heated in a vacuum oven (95 percent vacuum) for 16 hours at 85° C. The product, after cooling, was slurried in water, filtered, and the filter cake thoroughly washed with warm water (50° C.). The filter cake was then reslurried in water and neutralized to pH 8.0 with 0.07 mole NaOH, an amount approximately equivalent to a 0.07 D.S. product (70 percent reaction efficiency). A 15 g. Scott viscosity of 350 seconds per 50 ml. paste was found compared to a value of 70 seconds for the parent starch. This paste was only slightly turbid and did not setback on standing.

EXAMPLE III

*Preparation of thick boiling starch maleate half ester using $Na_2HPO_4$—$NaH_2PO_4$ buffer*

One mole of raw corn starch, 12 percent moisture (180 g.), was dry blended with 0.5 mole $Na_2HPO_4$ and 0.05 $NaH_2PO_4$ in 10 ml. of water and mixture dried to 12 percent moisture. The mixture was dry blended with 0.1 mole of maleic anhydride in 10 ml. of dimethylformamide. The pH was 4.5 (in a water slurry). The mixture was then heated 3 hours at 100° C. in an open oven. After cooling, the product was slurried in water (pH=3.3), filtered and washed as in Example I. The product D.S. was 0.038. An 8 g. D.B. Scott value of 167 seconds per 50 ml. of paste was found. The paste was only slightly opaque but stable on standing.

EXAMPLE IV

*Preparation of thin boiling starch maleate half ester*

One mole of raw starch, 12 percent moisture (180 g.), was dry blended with a warm solution (45° C.) consisting of 0.1 mole of maleic anhydride and 20 ml. of isopropyl alcohol. The pH was 2.3 as determined on a water slurry. The mixture was placed in a vacuum oven maintained at 100° C. and the mixture heated 1.5 hours at 100° C. under 95 percent vacuum. After cooling, the product was slurried in water, filtered and the filter cake washed with 1 liter of water. The product was reslurried in 50 percent aqueous methanol (pH=3.2) and then neutralized to pH 10.0 with 0.03 mole of N NaOH. The slurry was filtered and air dried. A 75 g. (12 percent moisture) Scott value of 53 seconds per 100 ml. of paste was found. The paste was extremely clear and did not setback on standing.

EXAMPLE V

*Preparation of thin boiling starch maleate half ester*

One mole of raw corn starch, 2 percent moisture (180 g.), was dry blended with 0.05 mole of maleic anhydride dispersed in 25 ml. of distilled water. The pH was 1.7 as determined on a water slurry. The mixture was heated in a vacuum oven for 2.5 hours at 95° C. After cooling, the product was reslurried in water (pH=1.5), filtered and the filter cake washed with 1 liter of distilled water. The product was reslurried in water (pH 2.7) and the product neutralized to pH 9.3 with 0.016 mole of N NaOH equivalent to a degree of substitution of 0.016. The product was filtered and the filter cake air dried. The fluidity of the product was 75. The cooked paste was extremely clear and did not setback on standing.

EXAMPLE VI

*Preparation of thin boiling starch phthalate half ester*

One mole of raw corn starch containing 12 percent moisture was blended with 0.1 mole (14.8 grams) of phthalic anhydride in 30 ml. of dimethylformamide (pK of phthalic acid=2.89). The pH was 2.1 when a portion of the mixture was slurried in water. The mixture was heated in an oven with an air sweep of 0.7 cubic foot per minute at 140° C. for 1 hour. After cooling, the product was slurried in 400 ml. of water (pH=2.0), filtered and the filter cake washed with 200 ml. of methanol followed with 500 ml. of water. The product was reslurried in 300 ml. of methanol and titrated from pH 4.0 to 8.5 with 0.065 mole NaOH showing the D.S. to be approximately 0.065 (65 percent reaction efficiency). A 50 g. Scott viscosity of 54 second per 100 ml. of paste was found equivalent to a fluidity of 68. The above paste was clear and did not setback on standing.

EXAMPLE VII

*Preparation of thick boiling starch phthalate half ester*

This experiment illustrates the preparation of a thick boiling starch acid phthalate by buffering the reaction mixture at pH 2.8–3.0 with a mixture of primary and secondary sodium phosphates.

One mole of raw corn starch was dried to 1 percent moisture; then a solution of 0.03 mole of $NaH_2PO_4$ and 0.02 mole of $Na_2HPO_4$ in 16 ml. of water was blended into the starch. After mixing until the buffer was uniformly distributed, 0.1 mole (14.8 g.) of phthalic anhydride in 30 ml. of dimethylformamide was blended homogeneously into the mixture. The pH was 2.8 when a portion of the product was slurried in water. The esterification reaction and purification of the product was performed exactly as in the above example. Degree of substitution of the product was 0.070. A 15 g. Scott viscosity of 58 second per 50 ml. of paste was observed showing the product to be thick boiling.

EXAMPLE VIII

*Preparation of thick boiling starch itaconate half ester*

Thick boiling starch acid itaconates may be prepared with or without using a buffer (pK of itaconic acid =3.84). However, by using $NaH_2PO_4$ or a mixture of the latter and $Na_2HPO_4$, a higher starch esterification efficiency can be obtained. The above phosphate salts, in addition to buffering action, also, appear to catalyze the esterification reaction. This example illustrates the preparation of thick boiling starch acid maleate using $NaH_2PO_4$ as a combination buffer and catalyst.

One mole of raw corn starch dried to about 1 percent moisture was blended with a solution of 0.05 mole $NaH_2PO_4$ in 16 ml. of water. This mixture was then mixed with 0.1 mole (11.2 g.) of itaconic anhydride,

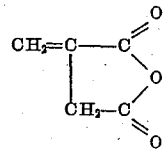

in 20 ml. of dimethylformamide until the mixture was uniform. The pH was 2.7 when a portion of the mixture was mixed with water. The mixture was heated in an oven with an air sweep of 0.7 cubic foot per minute at 140° C. for 1 hour. After cooling, the product was slurried in 400 ml. of water, the slurry filtered and the filter cake washed four times with alternate 200 ml. portions of methanol and water to insure complete removal of impurities. Finally, the wet filter cake was slurried in 300 ml. of methanol and the slurry titrated to pH 8.5 with 0.045 mole of NaOH showing the D.S. to be about 0.045. A 10 g. Scott viscosity of 100 seconds per 100 ml. of paste was observed showing the product to have a greater viscosity than the parent starch.

EXAMPLE IX

*Preparation of starch dichloromaleate half ester*

This example illustrates the preparation of a thin boiling starch acid dichloromaleate from starch dichloromaleic anhydride using $NaH_2PO_4$ to prevent excessive starch degradation (pK of dichloromaleic acid is less than 1.5).

One mole of raw corn starch at 12 percent moisture was blended with a solution of 0.05 mole $NaH_2PO_4$ in 8 ml. of water. Then 0.133 mole of dichloromaleic anhydride in 15 ml. of dimethylformamide was uniformly blended into the mixture. The pH was 1.4 when a portion of the product was slurried in water. The mixture was heated in an oven at 140° C. for 1 hour using an air sweep of 0.7 cubic foot per minute. After cooling the product was slurried in 400 ml. of 25 percent aqueous methanol, filtered and the filter cake washed with 200 ml. of water containing 0.04 mole HCl. Finally, the cake was washed with 1 liter of 25 percent aqueous methanol. Analysis showed the D.S. of the product to be 0.057. A 20 g. Scott viscosity of 95 seconds per 100 ml. of paste was found showing the product to be medium thin boiling.

EXAMPLE X

*Preparation of starch maleate half ester*

This example illustrates the preparation of a high D.S. starch maleate by adding maleic anhydride in increments during starch esterification.

One mole of raw corn starch at 12 percent moisture was mixed with 0.05 mole $NaH_2PO_4$ in 8 ml. of water. Then 0.39 mole of maleic anhydride in 15 ml. of dimethylformamide was blended into the starch. The mixture was heated 1.25 hours at 120° C., cooled and reblended first with 10 ml. of water, then with 0.39 mole of maleic anhydride in 15 ml. of dimethylformamide. After heating 3 hours at 120° C., the product was again cooled and mixed first with 6 ml. of water and then with 0.39 mole of maleic anhydride in 15 ml. of dimethylformamide. The mixture was heated 1 hour at 120° C. The product was cooled, slurried in 400 ml. of 80 percent methanol, filtered and the filter cake washed with 200 ml. of methanol containing 0.04 mole HCl. Finally the cake was washed with 2 liters of 80 percent aqueous methanol, reslurried in 500 ml. of methanol and titrated to pH 8.5 with NaOH. The D.S. of the product was 0.64 (55 percent over-all reaction efficiency). The viscosity of the product was about 50 fluidity.

EXAMPLE XI

*Preparation of thick boiling starch maleate half ester*

This example illustrates the preparation of thick boiling starch acid maleate using ammonium acid maleate buffer.

Maleic acid (0.05 mole) was dispersed in 8 ml. of water containing 0.06 mole $NH_4OH$. The solution (pH 5.0) was blended with one mole of raw corn starch at 12 percent moisture. Then 0.133 mole of maleic anhydride in 8 ml. of dimethylformamide was blended into the starch for 5 minutes using a Waring Blendor. The pH was 1.9 when a portion of the mixture was slurried in water. The reaction mixture was heated in an oven at 140° C. for 1 hour. After cooling, the product was slurried in 400 ml. of water (pH slurry 2.3), filtered and the filter cake washed with 200 ml. of water containing 0.042 mole HCl followed with 1 liter of water. The cake was reslurried in 300 ml. of methanol and titrated to pH 8.5 with NaOH. The D.S. of the product was 0.105. The product was thick boiling.

EXAMPLE XII

*Preparation of thick boiling starch maleate half ester*

One mole of raw corn starch at 12 percent moisture was mixed with 0.05 mole of $NaH_2PO_4$ in 8 ml. of water. Then 0.133 mole of maleic anhydride in 8 ml. of dimethylformamide was blended into the starch. The pH was 2.2 when a portion of the mixture was slurried in water. The reaction mixture was heated in a vacuum oven at 160° C. for 0.5 hour. After cooling the product was washed with water as in previous examples. The D.S. of the product was 0.083. A 14 g. Scott value of 50 seconds per 100 ml. of paste was observed.

EXAMPLE XIII

*Preparation of thick boiling starch maleate half ester*

One mole of raw corn starch at 12 percent moisture was mixed with 0.05 mole of $NaH_2PO_4$ in 8 ml. of water. Then 0.133 mole of maleic anhydride in 8 ml. of dimethylformamide was blended into the starch. The pH was 2.2 when a portion of the mixture was slurried in water. The reaction mixture was heated in a vacuum oven at 180° C. for 0.5 hour. After cooling the product was washed with water as in previous examples. The D.S. of the product was 0.106. A 12 g. Scott value of 72 seconds per 100 ml. of paste was observed showing the product to be thick boiling.

EXAMPLE XIV

*Preparation of thick boiling starch acid maleate using methyl ethyl ketone as solvent for the anhydride*

One mole of raw corn starch at 12 percent moisture was blended with 0.133 mole of maleic anhydride dispersed in 20 ml. of methyl ethyl ketone. Then, a buffer consisting of 0.04 mole $NaH_2PO_4$ and 0.01 mole $Na_2HPO_4$ in 8 ml. of water was blended into the mixture. The mixture was heated at 70° C. for 15 minutes and then reblended to give a homogeneous mixture. The mixture was heated in an oven 1 hour at 140° C. After cooling the product was washed with water as in previous examples. The D.S. of the product was 0.104. An 8 g. Scott value of 88 seconds per 100 ml. of paste was observed. The product by dye staining tests was uniformly derivatized.

EXAMPLE XV

*Preparation of thick boiling starch acid maleate using methyl isobutyl ketone as solvent for the anhydride*

The procedure of Example XIV was repeated using 10 ml. of methyl isobutyl ketone as the solvent for maleic anhydride. The D.S. of the product obtained was 0.10. A 20 g. Scott viscosity of 40 seconds per 100 ml. of paste was observed.

EXAMPLE XVI

*Preparation of thin boiling starch acid maleate*

This example illustrates the preparation of a thin boiling product starting with a thin boiling starch and esterifying with maleic anhydride under non-hydrolyzing conditions.

One mole of acid modified corn starch at 12 percent moisture, 70 fluidity, was heated to 60° C. Then 0.133 mole of maleic anhydride in 6 ml. of dimethylformamide heated to 60° C. was blended into the semidry starch. After mixing thoroughly, 0.04 mole $NaH_2PO_4$ and 0.01 mole $Na_2HPO_4$ in 8 ml. of water was blended into the mixture. The pH of the blend was 1.8. The blend was heated 1 hour at 140° C. After cooling the product was washed with water as in the previous examples. The D.S. of the product was 0.1 and the fluidity was 71 which is essentially the same as the fluidity of the parent starch. The product was uniformly derivatized, judging from the uniformity of dye staining. A paste of the product was extremely clear.

EXAMPLE XVII

*Preparation of thick boiling starch acid maleate*

One hundred and eighty grams of raw corn starch containing 12 percent of moisture was blended with 13 g. (0.133 mole) of maleic anhydride in 8 ml. of dimethylamide. Then 6.9 g. of $NaH_2PO_4$ in 8 ml. of water was blended into the mixture. The mixture was blended for 15 minutes at 50° C. The blend was slurried in 400 ml. of water, filtered and the filter cake was washed with 1 liter of water. The product was reslurried in 300 ml. of methanol and titrated to pH 8.5 with 0.03 mole NaOH showing a 23 percent reaction efficiency. The product was thick boiling.

This invention is a continuation-in-part of Serial No. 567,062, filed February 23, 1956, now abandoned.

We claim:

1. A process of producing starch half acid esters of organic acids which comprises heating an intimate mixture of an anhydride of a dibasic organic acid and starch containing 5 to 20 percent of moisture at a temperature within the range of about 50° C. to about 180° C., the pH being maintained within the range of about 1.4 to 5.5 as determined on a water slurry of the reaction mixture and recovering the resulting starch ester.

2. Process according to claim 1 wherein the anhydride is maleic anhydride.

3. Process according to claim 1 wherein the anhydride is succinic anhydride.

4. Process according to claim 1 wherein the anhydride is phthalic anhydride.

5. Process according to claim 1 wherein the anhydride is itaconic anhydride.

6. Process according to claim 1 wherein the anhydride is dichloromaleic anhydride.

7. Process according to claim 1 wherein a solution of anhydride in a solvent inert to starch is mixed with starch and the resulting mixture is used in making said starch ester.

8. Process according to claim 7 wherein the solvent is water.

9. Process according to claim 7 wherein the solvent is isopropyl alcohol.

10. Process according to claim 7 wherein the solvent is dimethylformamide.

11. Process according to claim 7 wherein the solvent is methyl ethyl ketone.

12. A process of producing thick boiling starch half acid esters of organic acids which comprises heating an intimate mixture of an anhydride of a dibasic organic acid having a pK value above about 3 and a starch containing 5 to 20 percent of moisture at a temperature within the range of about 50° C. to about 180° C., the pH being maintained within the range of about 1.8 to 5.5 as determined on a water slurry of the reaction mixture and recovering the resulting starch ester.

13. Process according to claim 12 wherein $NaH_2PO_4$ is used to maintain the pH in the range of 1.8 to 5.5.

14. Process according to claim 12 wherein a mixture of $NaH_2PO_4$ and $Na_2HPO_4$ is used to maintain the pH in the range of 1.8 to 5.5.

15. Process according to claim 12 wherein ammonium acid maleate is used to maintain the pH within the range of 1.8 to 5.5.

16. A process of producing thin boiling starch half acid esters of organic acids which comprises heating an intimate mixture of an anhydride of a dibasic organic acid and starch containing 5 to 20 percent of moisture at a temperature within the range of about 50° C. to about 180° C., the pH being maintained within the range of about 1.4 to 1.8 as determined on a water slurry of the reaction mixture and recovering the resulting starch ester.

17. A process of producing thin boiling starch half acid esters of organic acids which comprises heating an intimate mixture of an anhydride of a dibasic organic acid and an acid modified starch containing 5 to 20 percent moisture at a temperature within the range of about 50° C. to about 180° C., the pH being maintained within the range of about 1.8 to 5.5 as determined on a water slurry of the reaction mixture and recovering the resulting starch ester.

18. A process of producing salts of starch half acid esters of organic acids which comprises heating an intimate mixture of an anhydride of a dibasic organic acid and starch containing 5 to 20 percent of moisture at a temperature within the range of about 50° C. to about 180° C., the pH being maintained at about 1.4 to 5.5 as determined on a water slurry, removing any unreacted anhydride, adjusting the pH within the range of about 5.5 to about 8.5 and recovering the resultant salt of starch half acid ester.

References Cited in the file of this patent

UNITED STATES PATENTS

| | | |
|---|---|---|
| 2,461,139 | Caldwell | Feb. 8, 1949 |
| 2,661,349 | Caldwell | Dec. 1, 1953 |